(12) United States Patent
Badulescu et al.

(10) Patent No.: US 11,588,777 B2
(45) Date of Patent: *Feb. 21, 2023

(54) METHOD AND SYSTEM FOR REPORTING MESSAGE DISPOSITION IN A COMMUNICATION NETWORK

(71) Applicant: Telefonaktiebolaget LM Ericsson (publ), Stockholm (SE)

(72) Inventors: Cristina Badulescu, Roxboro (CA); Sorin Surdila, Laval (CA); Nancy M. Greene, Outremont (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/529,973

(22) Filed: Nov. 18, 2021

(65) Prior Publication Data

US 2022/0078153 A1 Mar. 10, 2022

Related U.S. Application Data

(63) Continuation of application No. 16/443,108, filed on Jun. 17, 2019, now Pat. No. 11,258,748, which is a
(Continued)

(51) Int. Cl.
*H04L 51/23* (2022.01)
*H04L 51/066* (2022.01)
(Continued)

(52) U.S. Cl.
CPC ............. *H04L 51/23* (2022.05); *H04L 51/04* (2013.01); *H04L 51/043* (2013.01);
(Continued)

(58) Field of Classification Search
CPC ....... H04L 51/23; H04L 51/234; H04L 51/04; H04L 51/043; H04L 51/066; H04L 69/18; H04W 4/14; H04W 4/18
See application file for complete search history.

(56) References Cited

U.S. PATENT DOCUMENTS 5,664,102 A 9/1997 Faynberg
7,734,705 B1 * 6/2010 Wheeler, Jr. ......... G06Q 10/107
709/206
(Continued)

FOREIGN PATENT DOCUMENTS

CN 1134635 A 10/1996
CN 1310540 A 8/2001
(Continued)

OTHER PUBLICATIONS

3GPP, 3rd Generation Partnership Project; Technical Specification Group Core Network and Terminals; Service Level Interworking (SLI) for messaging services, TS 29.311 V12.1.0 (Mar. 2015).
(Continued)

*Primary Examiner* — Viet D Vu
(74) *Attorney, Agent, or Firm* — Murphy, Bilak & Homiller, PLLC (57) ABSTRACT

Methods, servers and mobile stations are provided to allow a sender mobile station which has transmitted a message toward a recipient mobile station via a first protocol to be notified that the message has been delivered to the recipient mobile station via a different protocol. The sender mobile station may be notified that the message was delivered to the recipient mobile station via a different protocol method via a disposition notification message comprising an indication that the message was delivered to the recipient mobile station via a different protocol.

18 Claims, 7 Drawing Sheets

Related U.S. Application Data continuation of application No. 16/220,716, filed on Dec. 14, 2018, now Pat. No. 10,367,772, which is a continuation of application No. 15/119,826, filed as application No. PCT/IB2016/052957 on May 19, 2016, now Pat. No. 10,193,846.

(60) Provisional application No. 62/163,797, filed on May 19, 2015.

(51) Int. Cl.
| | | |
|---|---|---|
| *H04L 51/043* | (2022.01) | |
| *H04L 51/234* | (2022.01) | |
| *H04L 51/04* | (2022.01) | |
| *H04W 4/14* | (2009.01) | |
| *H04W 4/18* | (2009.01) | |
| *H04L 67/565* | (2022.01) | |
| *H04L 69/18* | (2022.01) | |

(52) U.S. Cl.
CPC .......... *H04L 51/066* (2013.01); *H04L 51/234* (2022.05); *H04W 4/14* (2013.01); *H04W 4/18* (2013.01); *H04L 67/565* (2022.05); *H04L 69/18* (2013.01)

(56) References Cited

U.S. PATENT DOCUMENTS

| | | |
|---|---|---|
| 2003/0050046 A1 | 3/2003 | Conneely |
| 2004/0019695 A1 | 1/2004 | Fellenstein |
| 2008/0021971 A1 | 1/2008 | Halgas |
| 2008/0123658 A1 | 5/2008 | Hyytia |
| 2009/0077191 A1* | 3/2009 | Bristow .................. H04L 51/56 709/207 |
| 2009/0197622 A1 | 8/2009 | Atarius |
| 2009/0221310 A1 | 9/2009 | Chen |
| 2010/0087215 A1 | 4/2010 | Gu |
| 2011/0072099 A1 | 3/2011 | Harju |
| 2011/0264747 A1 | 10/2011 | Mutikainen |
| 2012/0099524 A1 | 4/2012 | Cai |
| 2012/0149404 A1 | 6/2012 | Beattie, Jr. |
| 2013/0005371 A1 | 1/2013 | Cai |

FOREIGN PATENT DOCUMENTS

| | | |
|---|---|---|
| CN | 101202710 A | 6/2008 |
| CN | 101483839 A | 7/2009 |
| CN | 101971584 A | 2/2011 |
| CN | 103428218 A | 12/2013 |
| EP | 1903724 A1 | 3/2008 |
| EP | 2304907 | 11/2009 |
| EP | 2227044 B1 | 6/2014 |
| RU | 2431944 C2 | 10/2011 |
| RU | 2524841 C2 | 8/2014 |
| RU | 2013123782 A | 12/2014 |
| RU | 2014107670 A | 9/2015 |
| WO | 2007123370 A1 | 11/2007 |
| WO | 2013019260 A1 | 2/2013 |

OTHER PUBLICATIONS

E. Burger et al., Instant Message Disposition Notification (IMDN), Feb. 2009, Network Working Group Request for Comments: 5438.

H. Schulzrinne, Indication of Message Composition for Instant Messaging, Jan. 2005, Network Working Group Request for Comments: 3994.

K. Guimont, HowTo Tell iMessages From Text Messages, The Mac Observer, Aug. 29, 2014, https://www.macobserver.com/tmo/article/how-to-tell-imessages-from-text-messages.

OMA, Converged IP Messaging Architecture, Candidate Version 2.0—Jun. 11, 2013, Open Mobile Alliance, OMA-AD-CPM-V2_0-20130611-C.

RFC Errata, RFC5438, "Instant Message Disposition Notification (IMDN)", Feb. 2009, Reported by: Niket Kumar, http://www.rfc-editor.org/errata_search.php?rfc=5438.

\* cited by examiner

METHOD AND SYSTEM FOR REPORTING MESSAGE DISPOSITION IN A COMMUNICATION NETWORK

RELATED APPLICATIONS

The present application is a continuation application of U.S. patent application Ser. No. 16/443,108; entitled "METHOD AND SYSTEM FOR REPORTING MESSAGE DISPOSITION IN A COMMUNICATION NETWORK"; and filed at the United States Patent and Trademark Office on Jun. 17, 2019; which is a continuation application of U.S. patent application Ser. No. 16/220,716; entitled "METHOD AND SYSTEM FOR REPORTING MESSAGE DISPOSITION IN A COMMUNICATION NETWORK"; and filed at the United States Patent and Trademark Office on Dec. 14, 2018 (now U.S. Pat. No. 10,367,772); which is a continuation application of U.S. patent application Ser. No. 15/119,826; entitled "METHOD AND SYSTEM FOR REPORTING MESSAGE DISPOSITION IN A COMMUNICATION NETWORK" (now U.S. Pat. No. 10,193,846); which is a National Stage Entry of International Patent Application No. PCT/IB2016/052957; entitled "METHOD AND SYSTEM FOR REPORTING MESSAGE DISPOSITION IN A COMMUNICATION NETWORK"; and filed at the World Intellectual Property Organization on May 19, 2016; which claims the priority of U.S. Provisional Patent Application No. 62/163,797; entitled "METHOD AND SYSTEM FOR REPORTING MESSAGE DISPOSITION IN A COMMUNICATION NETWORK"; and filed at the United States Patent and Trademark Office on May 19, 2015. The content of all previous applications in incorporated herein by reference.

TECHNICAL FIELD

The present description generally relates to messaging in communication networks, and more particularly relates to notification of message disposition in communication networks.

BACKGROUND

Various messaging technologies can be employed today for delivering messages between mobile stations in a communication network. One of the most widely used messaging technologies is Short Message Service which is commonly known as SMS. SMS messages are usually transmitted over circuit-switched communication networks.

With the advent of packet-switched radio access network such as General Packet Radio Service (GPRS) network and more recently, Long Term Evolution (LTE) network, new forms of messaging services have become available. One of them is Instant Messaging (IM) service which is supported, for instance, by IP Multimedia Subsystem (IMS) networks. IMS is a framework which has been developed by the 3rd Generation Partnership Project (3GPP) to provide Internet-based services over packet-switched radio access networks such as GPRS, LTE and WiFi.

Packet-switched radio access networks are now deployed alongside legacy circuit-switched radio access networks. As such, mobile stations are now most often capable of accessing both circuit-switched networks and packet-switched networks. Hence, it is not uncommon for such mobile stations to now support SMS messaging, IM messaging, or both.

Sometimes however, a standalone message, a chat, a group chat or a file transfer request (e.g. an IM message) may need to be interworked to a legacy SMS messaging technology (e.g. as an SMS message) when the recipient mobile station is a mobile station which only supports SMS services (e.g. a legacy mobile station). Interworking of an IM message to an SMS message may also be needed during roaming scenarios during which the recipient mobile station is out of IMS coverage. In such scenario, the recipient would normally be able to receive the IM message but being unable to access the packet-switched radio access network, the recipient mobile station falls back to the circuit-switched radio access network over which only SMS messages can be received.

Still, current IM services supported by packet-switched networks such as IMS networks offer the possibility for the sender to be notified when the transmitted IM messages are delivered or read. For instance, RFC 5438—Instant Message Disposition Notification, provides a framework for such notifications. Most IM services may also provide the IM message sender an indication of the active typing from the recipient, thereby allowing the IM message sender to know that it should expect a reply. Such a feature has been described in RFC 3994—Indication of Message Composition for Instant Messaging.

As communication networks now support many types of mobile stations, some of them capable of receiving various types of messages while others limited to IM messages or SMS messages, mechanisms have been developed and put in place to allow an IM message to be interworked to an SMS message when the recipient is only capable of receiving SMS messages (e.g. the recipient uses a legacy mobile station or is out of IMS coverage). Similarly, an SMS message may also be interworked to an IM message if the recipient is limited to receiving IM messages.

However, when an IM message sent by a sender needs to be interworked due to the fact that the recipient is either using a legacy mobile station or is out of IMS coverage, most, if not all, the advanced notification functionalities, e.g. disposition notification, indication of message composition, etc., provided by the IM service are lost. Hence, when interworking between an IM message and a SMS message is performed, the sender of the IM message has no way of knowing that some of the advanced notification functionalities will not be available for the given message exchange or chat session.

For the sender, there is a perceived service loss and service inconsistency which may negatively affect the overall IM service experience. Still, it remains that setting proper user expectations is an important service aspect for network operators.

Therefore, it would be desirable to provide method and system that obviate or mitigate the above described problems.

SUMMARY

In accordance with the present description, methods and systems are provided to allow the sender of a message to be notified of the delivery of the message to the intended recipient via a protocol which may not support advanced disposition notification features. Consequently, the sender of the message will be able to adjust its expectations of the messaging experience with the recipient.

In a first exemplary embodiment, a method of operating a messaging application server generally comprises receiving a message originating from a sender mobile station, the message being addressed to a recipient mobile station, the message being received via a first protocol, determining that the recipient mobile station is not operative to receive the message via the first protocol, responsive to determining that the recipient mobile station is not operative to receive the message via the first protocol, converting the message into a format compliant with a second protocol different from the first protocol, wherein the recipient mobile station is operative to receive the converted message via the second protocol, transmitting the converted message toward the recipient mobile station via the second protocol, receiving a notification message comprising an indication that the converted message was delivered to the recipient mobile station, generating a disposition notification message comprising an indication that the message was delivered to the recipient mobile station via a different protocol, and transmitting the disposition notification message toward the sender mobile station via the first protocol.

In some embodiments, determining that the recipient mobile station is not operative to receive the message via the first protocol may comprise determining that the recipient mobile station is not configured, or does not have the capability, to receive the message via the first protocol.

In some embodiments, determining that the recipient mobile station is not operative to receive the message via the first protocol may comprise determining that the recipient mobile station is not within coverage of a communication network supporting the first protocol.

In some embodiments, determining that the recipient mobile station is not operative to receive the message via the first protocol may comprise receiving an error message comprising an indication that the recipient mobile station is not operative to receive the message via the first protocol.

In some embodiments, forwarding the converted message toward the recipient mobile station may comprise transmitting the converted message toward a communication network supporting the second protocol. In such embodiments, receiving a notification message comprising an indication that the converted message was delivered to the recipient mobile station may comprise receiving the notification message from the communication network.

In some embodiments, the message transmitted by the sender mobile station may be an Instant Messaging (IM) message, and the disposition notification message may be an Instant Message Disposition Notification, IMDN, message. In such embodiments, the IMDN message may comprise an element (e.g. status element) populated with a predetermined value (e.g. a predetermined sub-element). In some embodiments, the predetermined value may be indicative of a type of technology and/or of a type of network and/or of a type of protocol used to deliver the message to the recipient mobile station.

In some embodiments, the disposition notification message may be a delivery notification message, a processing notification message, or a display notification message.

In some embodiments, the first protocol is a packet-switched based protocol and the second protocol is a circuit-switched based protocol.

In some embodiments, the first protocol used by the sender mobile station to transmit the message may be the Session Initiation Protocol, SIP.

In some embodiments, the second protocol used to deliver the message to the recipient mobile station may be the Mobile Application Part (MAP) of the Signal System 7 (SS7) circuit-switched protocol.

In some embodiments, the second protocol used to deliver the message to the recipient mobile station may be a communication protocol supporting email services (e.g. Internet Message Access Protocol (IMAP), Post Office Protocol 3 (POP3), etc.).

In a second exemplary embodiment, a messaging application server configured to perform one or more messaging application server functionalities as described herein may comprise one or more communication interfaces configured to communicate (e.g. receive messages from and transmit messages to) with a first communication network (e.g. a packet-switched network such as an IP Multimedia Subsystem (IMS) network), and configured to communicate (e.g. receive messages from and transmit messages to) with a second communication network (e.g. a circuit-switched network such as a Public Land Mobile Network (PLMN)), and circuitry operatively connected to the communication interface(s), the circuitry being configured for performing messaging application server functionalities as described herein.

In some embodiments, the circuitry may comprise a processor and a memory having stored therein computer-readable instructions which when executed by the processor, allow the messaging application server to perform messaging application server functionalities as described herein. In some embodiments, the processor may be implemented as general purpose processing circuitry (e.g. processor, microprocessor, central processing unit, microcontroller, etc.), special purpose processing circuitry (e.g. application specific integrated circuits (ASIC), field programmable gate arrays (FPGA), etc.), or as a combination of both.

In a third exemplary embodiment, a messaging application server configured to perform one or more messaging application server functionalities as described herein may comprise a message receiving module configured to receive a message originating from a sender mobile station, the message being addressed to a recipient mobile station, the message being received via a first protocol, a determining module configured to determine that the recipient mobile station is not operative to receive the message via the first protocol, a converting module configured to convert the message into a format compliant with a second protocol different from the first protocol in response to the determining module determining that the recipient mobile station is not operative to receive the message via the first protocol, wherein the recipient mobile station is operative to receive the converted message via the second protocol, a converted message transmitting module configured to transmit the converted message toward the recipient mobile station via the second protocol, a notification message receiving module configured to receive a notification message comprising an indication that the converted message was delivered to the recipient mobile station, a disposition notification message generating module configured to generate a disposition notification message comprising an indication that the message was delivered to the recipient mobile station via a different protocol, and a disposition notification message transmitting module configured to transmit the disposition notification message toward the sender mobile station via the first protocol.

In a fourth exemplary embodiment, a method of operating a mobile station generally comprises transmitting a message toward a recipient mobile station via a first protocol, and receiving a disposition notification message in response to the transmitted message, the disposition notification message comprising an indication that the message was delivered to the recipient mobile station via a different protocol. The method may also comprise generating a user notification in response to receiving the disposition notification message comprising the indication that the message was delivered to the recipient mobile station via a different protocol.

In some embodiments, the method may comprise transmitting the message to a packet-switched network (e.g. an IP Multimedia Subsystem (IMS) network), and receiving the disposition notification message from the packet-switched network (e.g. the IMS network).

In some embodiments, the message transmitted by the mobile station may be an Instant Messaging (IM) message, and the disposition notification message may be an Instant Message Disposition Notification, IMDN, message. In such embodiments, the IMDN message may comprise an element (e.g. a status element) populated with a predetermined value (e.g. a predetermined sub-element). In some embodiments, the predetermined value may be indicative of a type of technology and/or of a type of network and/or of a type of protocol used to deliver the message to the recipient mobile station.

In some embodiments, the disposition notification message may be a delivery notification message, a processing notification message, or a display notification message.

In some embodiments, the protocol used by the mobile station to transmit the message is a packet-switched based protocol. In some embodiments, the protocol may be the Session Initiation Protocol, SIP.

In some embodiments, the protocol used to deliver the message to the recipient mobile station is a circuit-switched based protocol. In some embodiments, the protocol may be the Mobile Application Part (MAP) of the Signal System 7 (SS7) circuit-switched protocol.

In some embodiments, the protocol used to deliver the message to the recipient mobile station may be a communication protocol supporting email services (e.g. Internet Message Access Protocol (IMAP), Post Office Protocol 3 (POP3), etc.).

In a fifth exemplary embodiment, a mobile station configured to perform one or more mobile station functionalities as described herein may comprise a communication interface configured to communicate (e.g. receive messages from and transmit messages to) with a communication network (e.g. a packet-switched network such as an IMS network), and circuitry operatively connected to the communication interface, the circuitry being configured for performing mobile station functionalities as described herein.

In some embodiments, the circuitry may comprise a processor and a memory having stored therein computer-readable instructions which when executed by the processor, allow the mobile station to perform one or more mobile station functionalities as described herein. In some embodiments, the processor may be implemented as general purpose processing circuitry (e.g. processor, microprocessor, central processing unit, microcontroller, etc.), special purpose processing circuitry (e.g. application specific integrated circuits (ASIC), field programmable gate arrays (FPGA), etc.), or as a combination of both.

In a sixth exemplary embodiment, a mobile station configured to perform one or more mobile station functionalities as described herein may comprise a message transmitting module configured to transmit a message toward a recipient mobile station via a first protocol, and a disposition notification message receiving module configured to receive a disposition notification message in response to the transmitted message, the disposition notification message comprising an indication that the message was delivered to the recipient mobile station via a different protocol. The mobile station may also comprise a user notification generating module configured to generate a user notification in response to the disposition notification message receiving module receiving the disposition notification message.

Other aspects and features will become apparent to those ordinarily skilled in the art upon review of the following description of specific embodiments in conjunction with the accompanying figures.

BRIEF DESCRIPTION OF THE DRAWINGS

Embodiments will now be described, by way of example only, with reference to the attached figures, wherein.

DETAILED DESCRIPTION

The embodiments set forth below represent information to enable those skilled in the art to practice the embodiments. Upon reading the following description in light of the accompanying drawing figures, those skilled in the art will understand the concepts of the description and will recognize applications of these concepts not particularly addressed herein. It should be understood that these concepts and applications fall within the scope of the description. In the following description, numerous specific details are set forth. However, it is understood that embodiments may be practiced without these specific details. In other instances, well-known circuits, structures, and techniques have not been shown in detail in order not to obscure the understanding of the description. Those of ordinary skill in the art, with the included description, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

Figure 1:
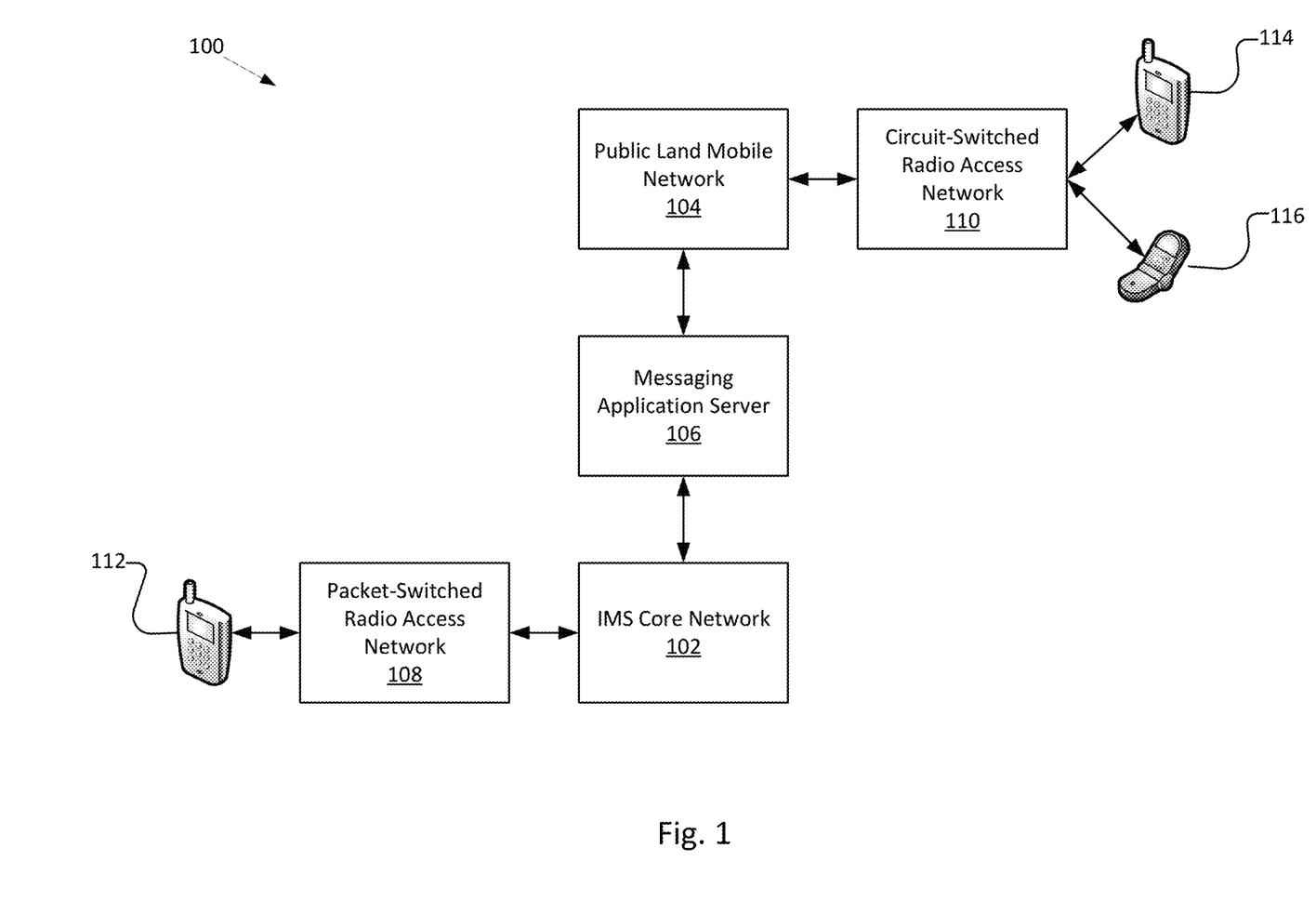
FIG. 1 is a schematic diagram of a simplified network architecture in accordance with some embodiments.

Referring first to FIG. 1, an exemplary and simplified network architecture 100 allowing messaging interworking is illustrated. The network architecture 100 generally comprises an IMS core network 102, a public land mobile network (PLMN) 104, and a messaging application server 106 which comprises the necessary interworking functionalities or modules (e.g. IP-Short-Message-Gateway (IP-SM-GW), Interworking Selection Function (ISF), etc.) to interwork messages exchanged between the IMS core network 102 and the PLMN 104.

As depicted in FIG. 1, the IMS core network 102 can be accessed over a packet-switched radio access network (RAN) 108 such as an evolved universal terrestrial radio access network (EUTRAN) compliant with the LTE standards. For its part, the PLMN 104 can be accessed over a circuit-switched radio access network (RAN) 110.

During normal operations of the network architecture 100, an IMS-enabled mobile station 112 can establish a Session Initiation Protocol (SIP) session with the IMS core network 102 in order for the mobile station 112 to be able to transmit and receive IMS-compliant messages, i.e. Instant Messaging (IM) messages, to and from the IMS core network 102. The IMS core network 102 is generally responsible for forwarding the IM messages to the appropriate IMS-enabled recipient mobile station according to the IMS framework.

However, on some occasions, the subscriber of the sender mobile station 112 may wish to send an IM message to a recipient mobile station which is not operative to receive IM messages.

In some cases, the recipient mobile station which is not operative to receive IM messages could be an IMS-enabled mobile station, such as mobile station 114 in FIG. 1, which is unable to access the IMS core network 102. For instance, mobile station 114 could be outside the coverage of a packet-switched RAN such as packet-switched RAN 108 and thus outside of IMS coverage.

In other cases, the recipient mobile station could be a non-IMS-enabled mobile station (e.g. a legacy mobile station) such as mobile station 116 in FIG. 1. Such a mobile station 116 would be unable to receive IM messages.

Messaging applications running on IMS-enabled mobile stations such as mobile station 112 are generally provided with additional features. For instance, such applications may indicate if the IM message sent by the subscriber was properly delivered to the recipient mobile station. To allow such notification to be done, Instant Message Disposition Notification (IMDN) messages (e.g. as defined in RFC 5438, incorporated herein by reference) are generated by the IMS core network 102 and transmitted back to the sender mobile station.

However, when an IMS-enabled sender mobile station transmits an IM message toward a mobile station which is either outside of IMS coverage (e.g. mobile station 114 in FIG. 1) or non-IMS-enabled (e.g. mobile station 116 in FIG. 1), the messaging application server must interwork the IM message, that is convert or otherwise translate the IM message into a Short Message Service (SMS) message or a Multimedia Messaging Service (MMS) message, before forwarding it to the recipient mobile station 114 or 116 via the PLMN 104.

It will be appreciated that when an IM message is interworked by the messaging application server, the sending subscriber has no way to know whether the IM message was delivered properly. Hence, in accordance with the present description, the messaging application server is configured to populate the IMDN message it generates in response to the delivery of an IM message via interworking with an indication that the IM message was delivered to the recipient mobile station via a different protocol. As such, the sending subscriber will know that the mobile station of the recipient subscriber does not support the additional disposition notification capabilities and thus, the sending subscriber will not expect such disposition notifications.

Figure 2:
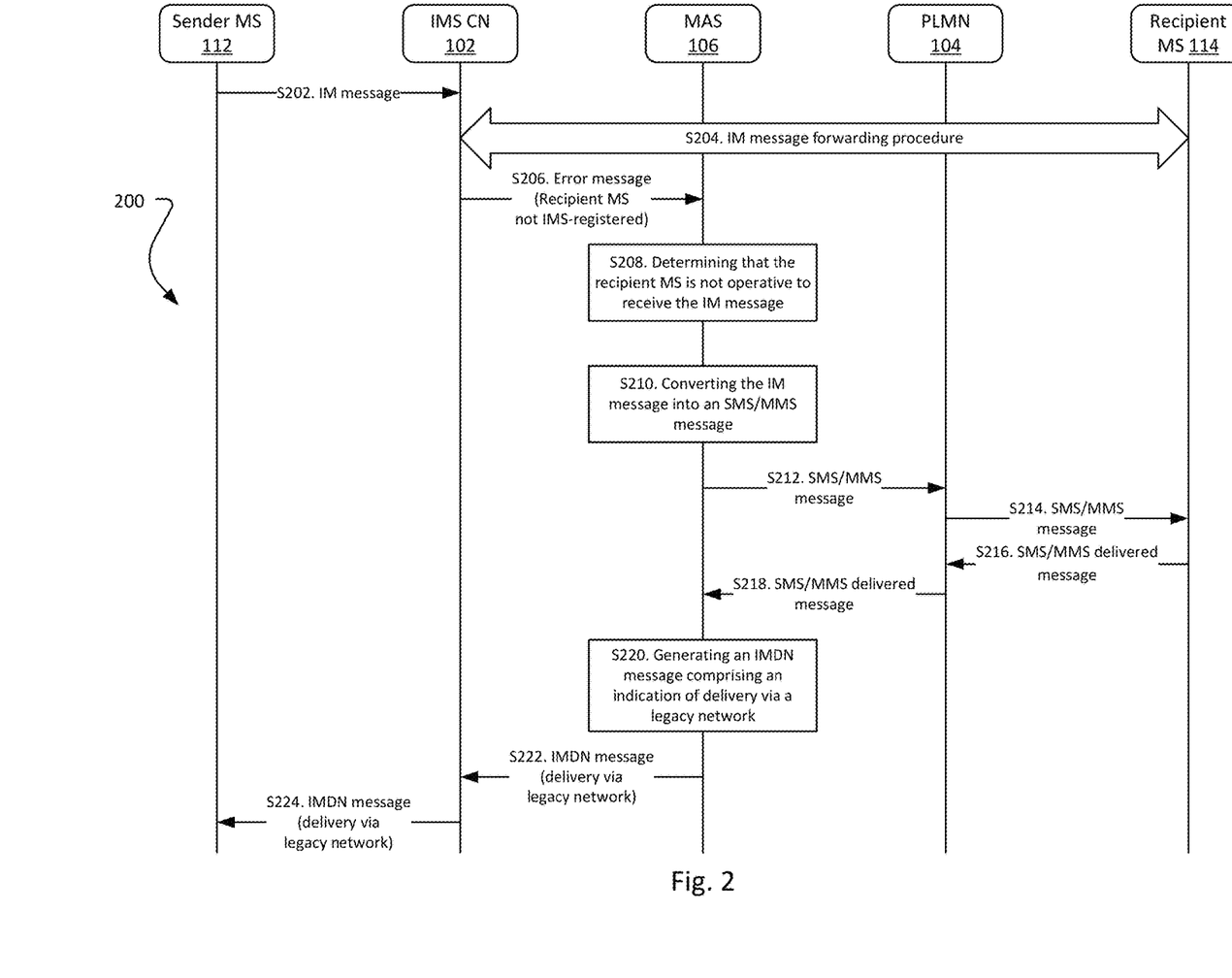
FIG. 2 is a signaling diagram of a first exemplary scenario in accordance with some embodiments.

FIG. 2 illustrates an exemplary signaling diagram of a scenario 200 in which an IM message is interworked into an SMS or an MMS message (hereafter, SMS/MMS message) by the messaging application server 106.

At S202, the IMS-enabled mobile station 112 sends an IM message, addressed to the IMS-enabled recipient mobile station 114, to the IMS core network 102. This IM message may be transmitted via Session Initiation Protocol (SIP) (i.e. a first protocol). Upon receiving the IM message, the IMS core network 102 tries to forward, at S204, the IM message to the recipient mobile station 114 according to normal IMS procedure. Upon failing to deliver the IM message to the recipient mobile station 114 according to normal IMS procedure, the IMS core network 102 notifies, at S206, the messaging application server 106 of an error in trying to deliver the IM message. The error notification transmitted by the IMS core network 102 to the messaging application server 106 may comprise an indication that the IMS-enabled recipient mobile station 114 is not IMS-registered (e.g. out of IMS coverage).

After receiving the error notification from the IMS core network 102, the messaging application server 106 determines, at S208, that the recipient mobile station 114 is not operative to receive the IM message via IMS. Upon making this determination, the messaging application server 106 converts, or otherwise translates, at S210, the IM message into an SMS/MMS message.

At S212, the messaging application server 106 then forwards the interworked IM message, now as an SMS/MMS message, to the PLMN 104, which further delivers, at S214, the SMS/MMS message to the recipient mobile station 114 via the circuit-switched RAN 110.

Upon receiving the SMS/MMS message, the recipient mobile station 114 transmits, at S216, a SMS/MMS delivered message (e.g. a Submit report) to the PLMN 104 which further forwards it to the messaging application server 106 at S218.

After receiving the SMS/MMS delivered message, the messaging application server 106 generates, at S220, an IMDN message comprising an indication that the IM message was delivered to the recipient mobile station 114 albeit via a different protocol (e.g. via a legacy network). The messaging application server 106 then transmits the IMDN message to the IMS core network 102, at S222, which further forwards it to the sender mobile station 112, at S224, via the packet-switched RAN 108.

Figure 3:
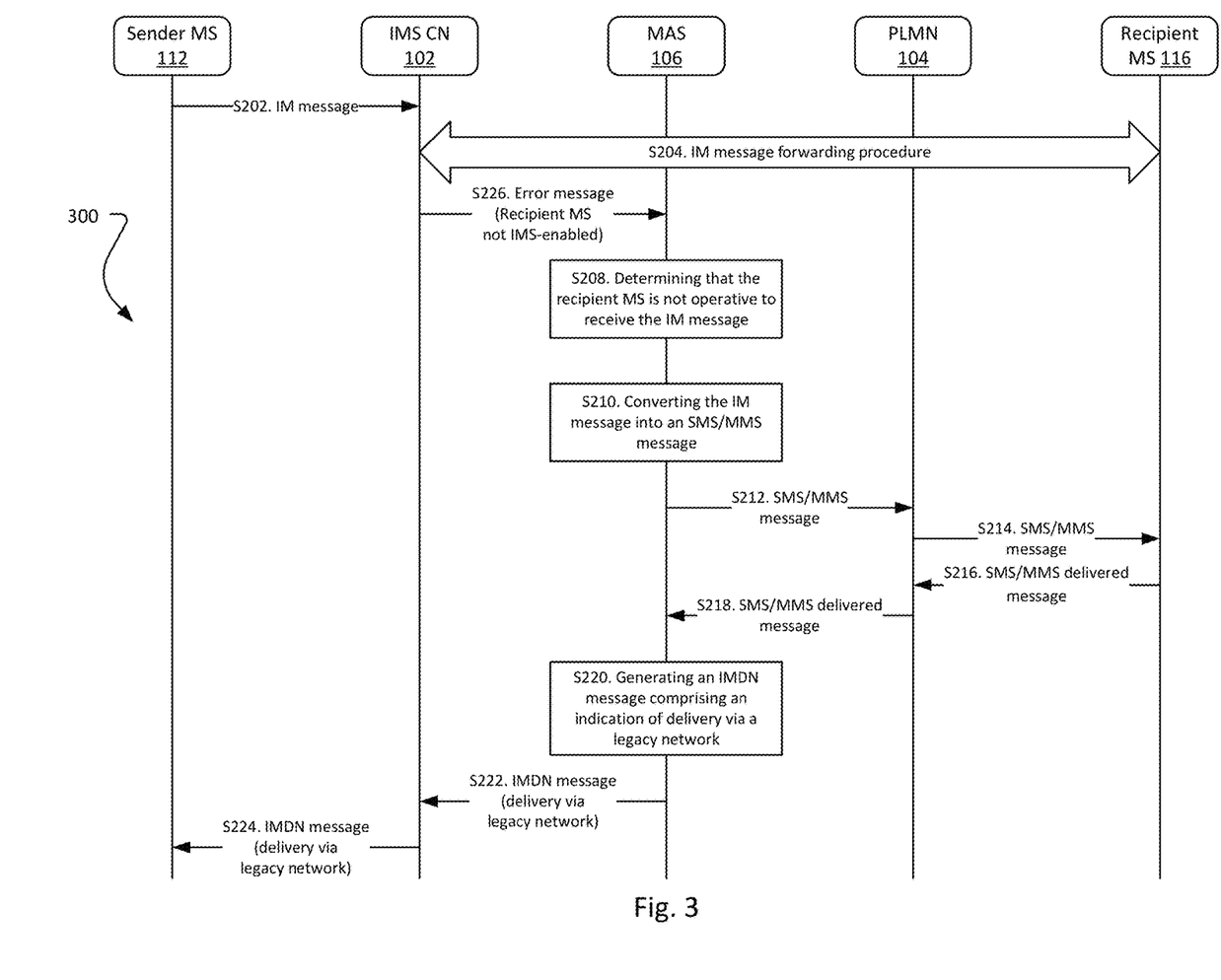
FIG. 3 is a signaling diagram of a second exemplary scenario in accordance with some embodiments.

FIG. 3 illustrates an exemplary signaling diagram of another scenario in which an IM message is interworked into an SMS/MMS message by the messaging application server 106. Scenario 300 is similar to scenario 200 and as such, only the differing steps will be described.

In scenario 300, the recipient mobile station 116 is not IMS-enabled, in contrast to scenario 200 in which the recipient mobile station 114 was IMS-enabled but outside of IMS coverage and thus unreachable via the IMS core network 102. Hence, in scenario 300, the error message returned by the IMS core network 102 to the messaging application server 106, at S226, upon failing to forward the IM message to the recipient mobile station 116 may comprise an indication that the recipient mobile station 116 is not IMS-enabled (e.g. the recipient mobile station 116 is a legacy mobile station).

From the point of view of the sender mobile station 112 and of the messaging application server 106, both scenarios 200, 300 are essentially identical. Indeed, for the sender mobile station 112, whether the recipient mobile station is IMS-enabled (e.g. mobile station 114) but out of IMS coverage or simply not IMS-enabled (e.g. mobile station 116), the IMDN message that the sender mobile station 112 will receive will indicate, in both cases, that the IM message was delivered via a different protocol (e.g. via a legacy network). Likewise, for messaging application server 106, once it has determined that the recipient mobile station is not operative to receive the IM message (i.e. step S208), the messaging application server 106 will convert, or otherwise translate, the IM message into an SMS/MMS message and forward it to the PLMN 104 for delivery to the recipient mobile station via the legacy network.

In some embodiments, the IMDN message generated by the messaging application server 106 can be one of a delivery notification message, a processing notification message, and a display notification message. Notably, the particular type of IMDN message generated by the messaging application server 106 can be requested in the IM message sent by the sender mobile station 112. For instance, the IM message sent by the sender mobile station 112 could comprise an indication of a request to receive a delivery IMDN message.

IMDN messages generally comprise a status element which can be populated with predetermined values, each indicative of particular disposition status. However, the status element of different types of IMDN messages may carry different predetermined values. For instance, in an IMDN message indicating delivery, the status element may carry one of the following sub-elements: <delivered>, <failed>, <forbidden>, or <error>. For IMDN message indicating processing, the status element may carry one of the following sub-elements: <processed>, <stored>, <forbidden>, or <error>. Finally, for IMDN message indicating display, the status element may carry one of the following sub-elements: <displayed>, <forbidden>, or <error>.

It will be appreciated that the status sub-elements <delivered> and <failed> (for delivery IMDN messages), <processed> and <stored> (for processing IMDN messages), and <displayed> (for display IMDN messages) are self-explanatory. With respect to the <forbidden> sub-element and <error> sub-element, they generally respectively indicate that the disposition was denied and that an internal server error has occurred.

In order to notify the sender mobile station 112 that the IM message was delivered via a different protocol, e.g. a legacy network supporting a different protocol, IMDN messages may need to carry information reflective of the technology used to deliver the original message.

In some embodiments, this information can be carried as a new sub-element of the status element of the IMDN message. This additional sub-element may indicate, for instance, that the IM message was disposed of via a protocol different from SIP and which is not IMS compliant. In some embodiments, this additional sub-element may generically be identified as <legacy-messaging>. Understandably, in other embodiments, this additional sub-element could have a different name, e.g. <legacy-network>, <legacy-SMS>, <legacy-MMS>, <legacy-email>, etc. reflective of the legacy nature of the delivery technology.

In other embodiments, this information can be carried as an IMDN message indicating interworking, e.g. an interworking notification message. As the other IMDN messages, the status of this IMDN message could include one or more sub-elements, including the new sub-elements such as <legacy-SMS>, <legacy-MMS>, <legacy-email>, etc. listed above, reflective of the technology used to deliver the original message.

In addition, in some embodiments, more than one predetermined value could be used to populate the status element of the IMDN message. For instance, if it is desired to make a distinction between an IM message delivered as an SMS message and an IM message delivered as an MMS message, the status element of the IMDN message could be populated with <legacy-SMS> when an IM message is delivered as an SMS message, or with <legacy-MMS> when an IM message is delivered as an MMS message.

Notably, when the sender mobile station receives an IMDN message with its status element populated with the sub-element <legacy-messaging>, or any other equivalent sub-element, or an interworking IMDN message, the messaging application which has sent the IM message for which the IMDN message is received can process the IMDN message accordingly. For instance, the messaging application can provide an indication, e.g. a visual indication, that the IM message sent by the sender mobile station has been delivered, or otherwise disposed of, albeit via a different protocol (e.g. different from SIP) and which does not support advanced disposition notifications. As such, the user of the sender mobile station 112 can be made aware that it should not expect advanced disposition notifications (e.g. display notifications) or indications of the other party typing a message, for the current message exchange with the user of the recipient mobile station 114 or 116. By making the user of the sender mobile station 112 aware that it should not expect advanced disposition notifications or message composing indications from the other party, the user of the sender mobile station is less likely to be disappointed by the lack of richer features naturally present with the first protocol, in the current message exchange.

It will be appreciated that for the IMS-enabled mobile station 112 to receive an IMDN message, it typically needs to include a request to that effect in the transmitted IM message. In embodiments where the indication of interworking of the message to a legacy messaging technology is captured via a new sub-element (e.g. <interworking-notification>) of the existing disposition notification types (e.g. delivery, processing, display), the IMS-enabled mobile station 112 may list one or more of the new sub-element values (e.g. <legacy-sms>, etc.), or a generic "interworking" value, for which it requests to receive a notification. For instance, under the procedure described in RFC5438, the IMS-enabled mobile station 112 may add a generic "interworking" value, alongside the existing "positive-delivery" and "negative-delivery" values, in the header of the IM message, to receive notification of interworking. In embodiments where the indication of interworking of the message to a legacy messaging technology is captured via a new type of disposition notification (e.g. interworking IMDN message), the IMS-enabled mobile station 112 may simply list it as a top level notification type "interworking" (e.g. as specified in RFC5438 for the "display" and "processing" notifications).

Figure 4:
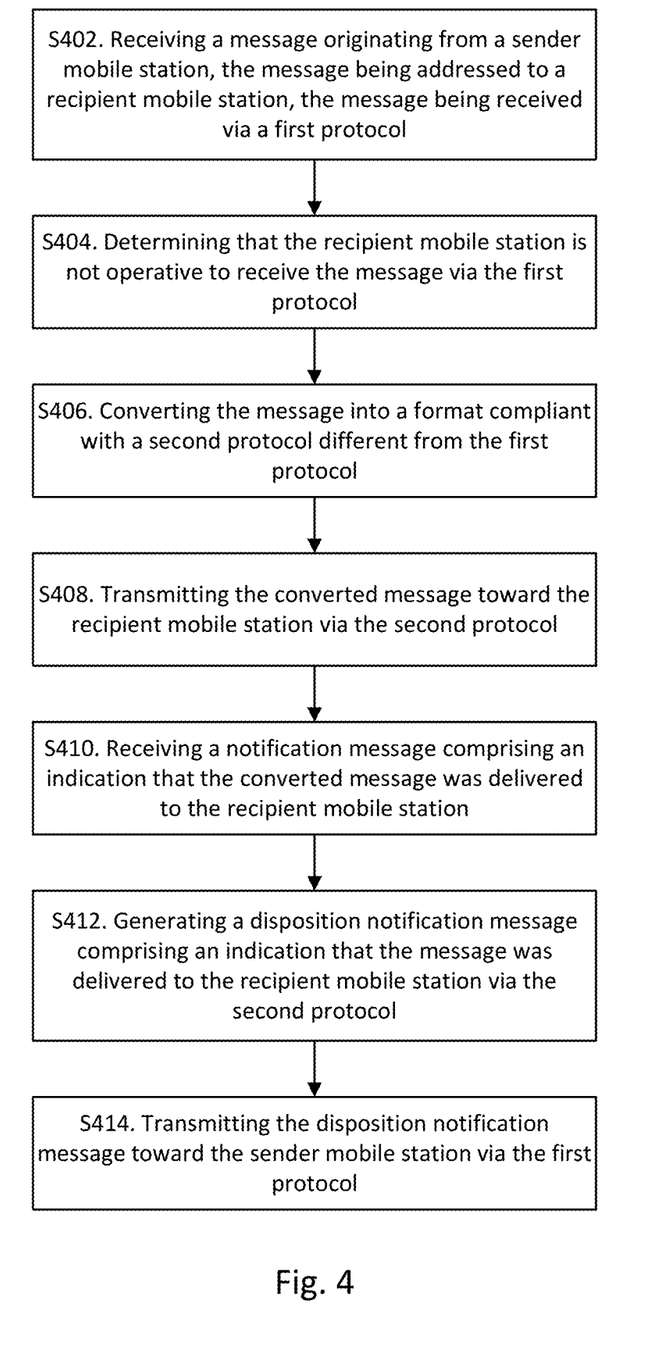
FIG. 4 is a flow chart of a method performed at a messaging application server in accordance with some embodiments.

Turning now to FIG. 4, an embodiment of a method of operating the messaging application server 106 is illustrated. The messaging application server 106 first receives a message (e.g. an IM message) originating from a sender mobile station and addressed to a recipient mobile station (step S402). The message is received via a first protocol (e.g. SIP). Then, the messaging application server 106 determines that the recipient mobile station to which the message is addressed is not operative to receive the message via the first protocol (step S404). As indicated above, it can be that the recipient mobile station is IMS-enabled, and should normally be able to receive the IM message, but is currently out of IMS coverage and as such, cannot receive the IM message. In other words, the IM message cannot be routed to the recipient mobile station via IMS. It can also be that the recipient mobile station is not IMS-enabled since it is, for instance, a legacy mobile station. Once the messaging application server 106 has determined that the recipient mobile station 114 or 116 is not operative to receive the message via the first protocol, the messaging application server 106 converts, or otherwise translates, the message into a message (e.g. an SMS/MMS message) compliant with a second protocol (e.g. MAP SS7 protocol) (step S406). Once the message has been converted into a converted message, the messaging application server 106 transmits the converted message toward the recipient mobile station (step S408), via the second protocol.

Then, the messaging application server 106 receives a notification message (e.g. a SMS/MMS delivered message) indicating that the converted message has been delivered to the recipient mobile station (step S410). In response to the reception of this notification message, the messaging application server 106 then generates a disposition notification message (e.g. an IMDN message) comprising an indication that the message was delivered via a different protocol (step S412). Finally, the messaging application server 106 transmits the generated disposition notification message towards the sender mobile station (step S414).

In some embodiments, the messaging application server 106 may determine that the recipient mobile station is not operative to receive the message via the first protocol upon receiving an error message from the network (e.g. IMS core network) through which the message has been received. In some embodiments, the messaging application server 106 may determine itself that the recipient mobile station is not operative to receive the message via the first protocol.

Figure 5:
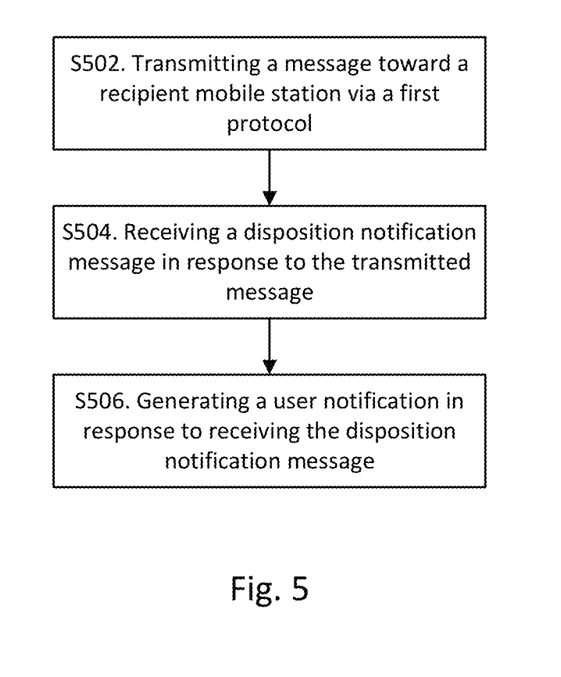
FIG. 5 is a flow chart of a method performed at a mobile station in accordance with some embodiments.

Referring now to FIG. 5, an embodiment of a method of operating a mobile station is illustrated. The method starts with the mobile station sending a message (e.g. an IM message) addressed to a recipient mobile station (step S502), the message being sent via a first protocol (e.g. SIP). Then, the mobile station receives a disposition notification message (e.g. an IMDN message) comprising an indication that the message was delivered to the recipient mobile station but via a different protocol (step S504).

In some embodiments, upon receiving the disposition notification message comprising the indication that the message was delivered to the recipient mobile station via a different protocol, the mobile station may generate a user notification (e.g. a visual notification) to notify the subscriber of the mobile station, or otherwise make the subscriber aware, that the message was delivered to the recipient mobile station via a different protocol (step S506). In some embodiments, the notification may comprise an indication (e.g. a message) displayed by the mobile station. In some embodiments, the user notification may comprise the use of a different color.

Figure 6:
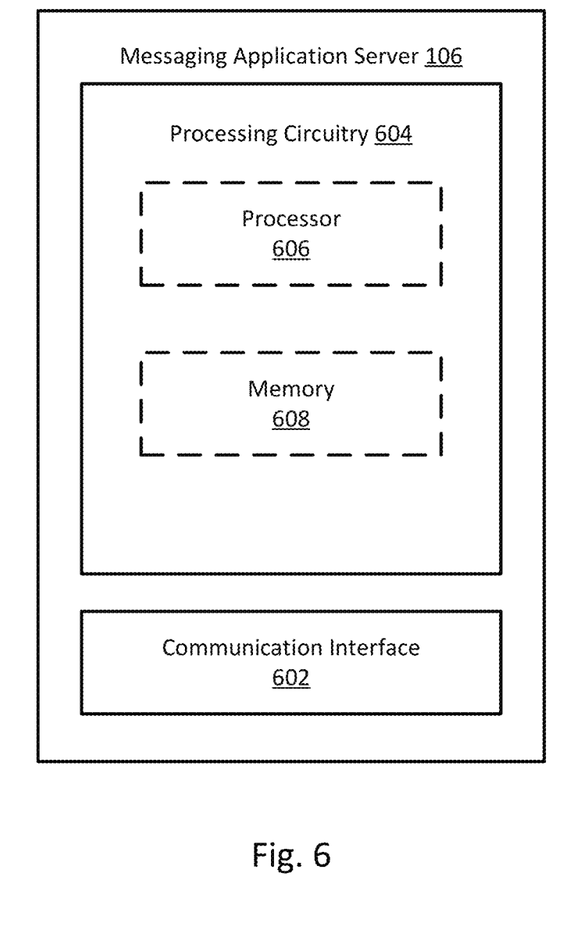
FIG. 6 is a block diagram of a messaging application server in accordance with some embodiments.

FIG. 6 illustrates an embodiment of a messaging application server 106 adapted for use in one or more of the described embodiments. The messaging application server 106 comprises one or more communication interfaces 602 configured to communicate (e.g. receive messages from and transmit messages to) with a first communication network (e.g. an IMS network), and configured to communicate (e.g. receive messages from and transmit messages to) with a second communication network (e.g. a PLMN), and circuitry 604 operatively connected to the communication interface(s) 602, the circuit being configured for performing messaging application server functionalities as described herein.

In some embodiments, the circuitry 604 may comprise a processor 606 and a memory 608 having stored therein computer-readable instructions which when executed by the processor 606, allow the messaging application server 106 to perform messaging application server functionalities as described herein.

In some embodiments, the processor 606 may be implemented as general purpose processing circuitry (e.g. processor, microprocessor, central processing unit, microcontroller, etc.), special purpose processing circuitry (e.g. application specific integrated circuits (ASIC), field programmable gate arrays (FPGA), etc.), or as a combination of both.

Figure 7:
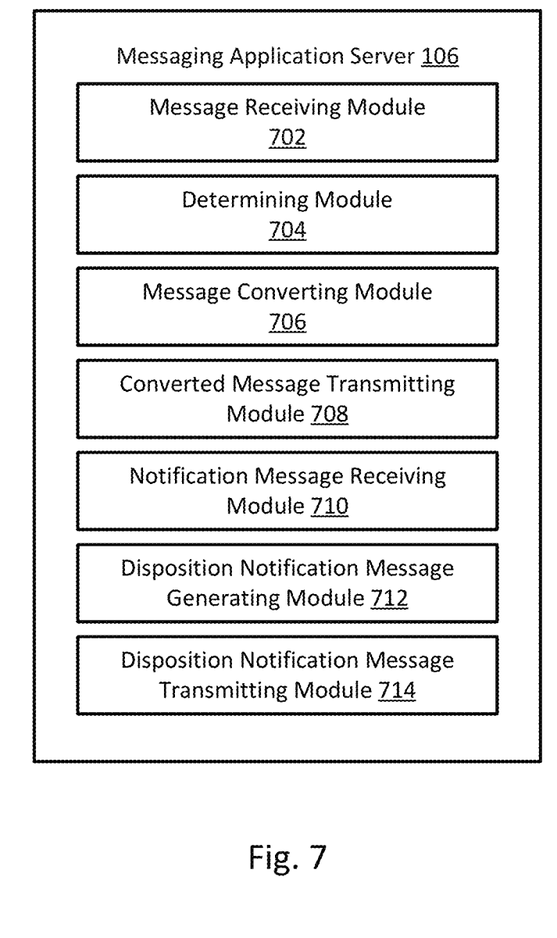
FIG. 7 is another block diagram of a messaging application server in accordance with some embodiments.

FIG. 7 shows another embodiment of a messaging application server 106 adapted for use in one or more of the described embodiments. In the embodiment of FIG. 7, the messaging application server 106 comprises a message receiving module 702 configured to receive a message (e.g. an IM message) originating from a sender mobile station, the message being addressed to a recipient mobile station, the message being received via a first protocol (e.g. SIP). The messaging application server 106 also comprises a determining module 704 configured to determine that the recipient mobile station is not operative to receive the message via the first protocol, and a converting module 706 configured to convert the message into a format compliant with a second protocol (e.g. MAP SS7) different from the first protocol in response to the determining module 704 determining that the recipient mobile station is not operative to receive the message via the first protocol. Understandably, it will be appreciated that the recipient mobile station is operative to receive the converted message (e.g. an SMS/MMS message) via the second protocol. The messaging application server 106 also comprises a converted message transmitting module 708 configured to transmit the converted message toward the recipient mobile station via the second protocol, and a notification message receiving module 710 configured to receive a notification message comprising an indication that the converted message was delivered to the recipient mobile station. The messaging application server 106 also comprises a disposition notification message generating module 712 configured to generate a disposition notification message (e.g. an IMDN message) comprising an indication that the message sent by the sender mobile station was delivered to the recipient mobile station via a different protocol, and a disposition notification message transmitting module 714 configured to transmit the disposition notification message toward the sender mobile station via the first protocol.

Figure 8:
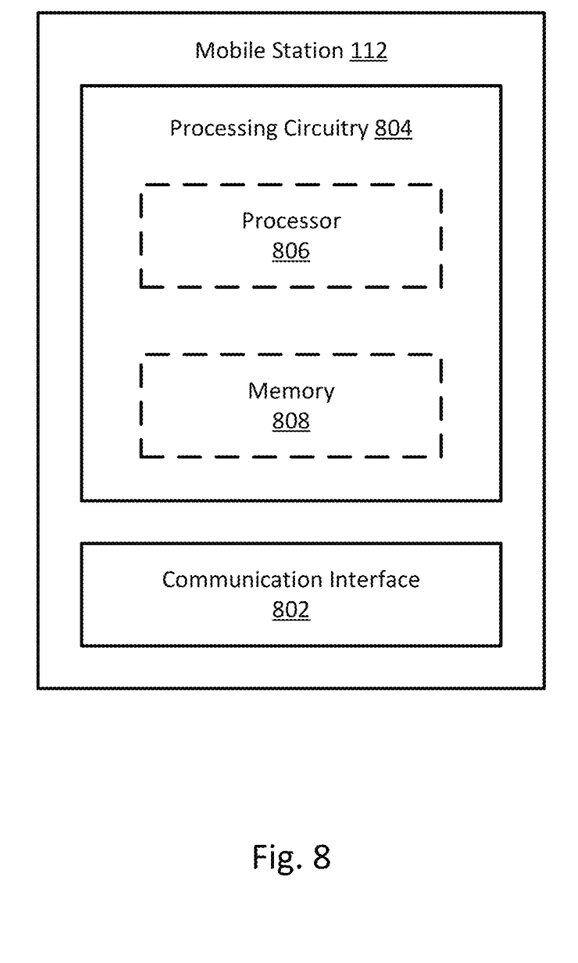
FIG. 8 is a block diagram of a mobile station in accordance with some embodiments.

FIG. 8 illustrates an embodiment of a mobile station 112 adapted for use in the above exemplary embodiments. The mobile station 112 comprises a communication interface 802 configured to communicate (e.g. receive messages from and transmit messages to) with a communication network (e.g. IMS network), and circuitry 804 operatively connected to the communication interface 802. The circuitry 804 is generally responsible for controlling the operations of the mobile station 112.

In some embodiments, the circuitry 804 may comprise a processor 806 and a memory 808 having stored therein computer-readable instructions which when executed by the processor 806, allow the mobile station to perform mobile station functionalities as described herein. In some embodiments, the processor 806 may be implemented as general purpose processing circuitry (e.g. processor, microprocessor, central processing unit, microcontroller, etc.), special purpose processing circuitry (e.g. application specific integrated circuits (ASIC), field programmable gate arrays (FPGA), etc.), or as a combination of both.

Figure 9:
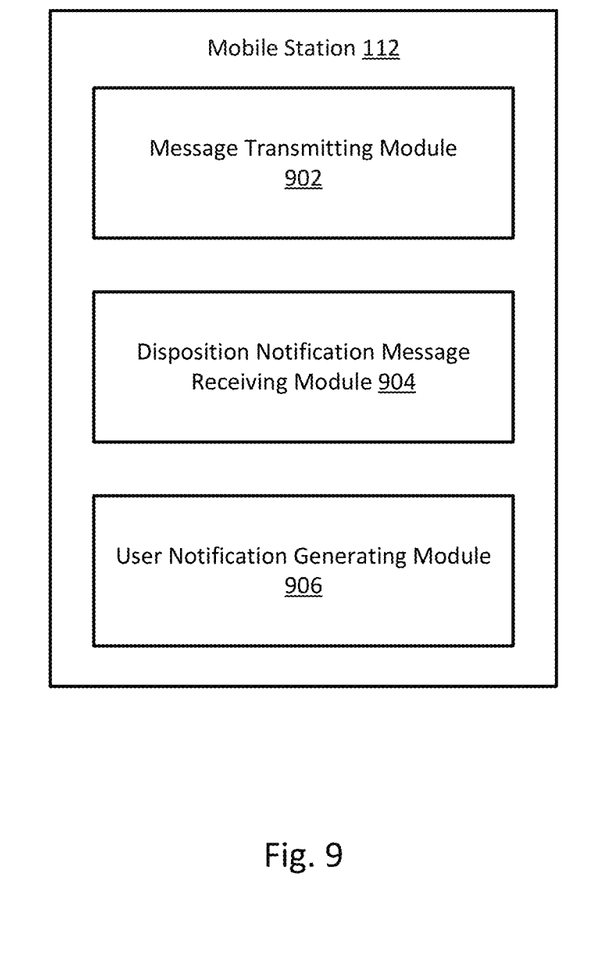
FIG. 9 is another block diagram of a mobile station in accordance with some embodiments.

FIG. 9 illustrates another embodiment of a mobile station 112 adapted for use in the above exemplary embodiments. The mobile station 112 comprises a message transmitting module 902 configured to transmit a message (e.g. an IM message) toward a recipient mobile station via a first protocol, and a disposition notification message receiving module configured to receive a disposition notification message (e.g. an IMDN message) in response to the transmitted message, the disposition notification message comprising an indication that the transmitted message was delivered to the recipient mobile station via a different protocol. The mobile station 112 may also comprise a user notification generating module 906 configured to generate a user notification in response to the disposition notification message receiving module receiving the disposition notification message.

Some embodiments may be represented as a non-transitory software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to one or more of the described embodiments. Those of ordinary skill in the art will appreciate that other instructions and operations necessary to implement the described embodiments may also be stored on the machine-readable medium. Software running from the machine-readable medium may interface with circuitry to perform the described tasks.

The above-described embodiments are intended to be examples only. Alterations, modifications and variations may be effected to the particular embodiments by those of skill in the art without departing from the scope of the description.

The invention claimed is:

1. A method in a communication network comprising a sender mobile station, a recipient mobile station, and a messaging application server, the method comprising:
   transmitting, by the sender mobile station, a message addressed to the recipient mobile station, the message being formatted according to a first messaging protocol;
   receiving, by the messaging application server, the message originating from the sender mobile station;
   responsive to determining, by the messaging application server, that the recipient mobile station is not operative to receive the message formatted according to the first messaging protocol, converting, by the messaging application server, the message to a format compliant with a second messaging protocol different from the first messaging protocol, wherein the recipient mobile station is operative to receive the converted message formatted according to the second messaging protocol;
   transmitting, by the messaging application server, the converted message toward the recipient mobile station;
   receiving, by the messaging application server, a notification message originating from the recipient mobile station, the notification message indicating that the converted message was delivered to the recipient mobile station, the notification message being formatted according to the second messaging protocol;
   responsive to receiving the notification message, generating by the messaging application server, a disposition notification message indicating that the message was delivered to the recipient mobile station via a messaging protocol different from the first messaging protocol, wherein the disposition notification message comprises a status element populated with a predetermined value identifying the second messaging protocol, the disposition notification message being formatted according to the first messaging protocol; and
   transmitting, by the messaging application server, the disposition notification message toward the sender mobile station.

2. The method as claimed in claim 1, wherein determining, by the messaging application server, that the recipient mobile station is not operative to receive the message formatted according to the first messaging protocol comprises determining, by the messaging application server, that the recipient mobile station is not configured to receive messages formatted according to the first messaging protocol.

3. The method as claimed in claim 1, wherein determining, by the messaging application server, that the recipient mobile station is not operative to receive the message formatted according to the first messaging protocol comprises receiving, by the messaging application server, an error message indicating that the recipient mobile station is not operative to receive messages formatted according to the first messaging protocol.

4. The method as claimed in claim 1, further comprising receiving, by the recipient mobile station, the converted message formatted according to the second messaging protocol.

5. The method as claimed in claim 4, further comprising, in response to receiving the converted message, transmitting, by the recipient mobile station, the notification message toward the messaging application server.

6. The method as claimed in claim 1, further comprising generating, by the sender mobile station, a user notification in response to receiving the disposition notification message.

7. The method as claimed in claim 6, wherein the generated user notification indicates that the message was delivered to the recipient mobile station via a messaging protocol different from the first messaging protocol.

8. The method as claimed in claim 1, wherein the first messaging protocol supports more messaging functionalities than the second messaging protocol.

9. The method as claimed in claim 1, wherein the first messaging protocol is a packet-switched based messaging protocol, and the second messaging protocol is a circuit-switched based messaging protocol.

10. A communication network comprising:
   a sender mobile station configured to:
   transmit a message addressed to a recipient mobile station, the message being formatted according to a first messaging protocol;
   a messaging application server configured to:
   receive the message originating from the sender mobile station;
   responsive to determining that the recipient mobile station is not operative to receive the message formatted according to the first messaging protocol, convert the message to a format compliant with a second messaging protocol different from the first messaging protocol, wherein the recipient mobile station is operative to receive the converted message formatted according to the second messaging protocol;

transmit the converted message toward the recipient mobile station;

receive a notification message originating from the recipient mobile station, the notification message indicating that the converted message was delivered to the recipient mobile station, the notification message being formatted according to the second messaging protocol;

responsive to receiving the notification message, generate a disposition notification message indicating that the message was delivered to the recipient mobile station via a messaging protocol different from the first messaging protocol, wherein the disposition notification message comprises a status element populated with a predetermined value identifying the second messaging protocol, the disposition notification message being formatted according to the first messaging protocol; and transmit the disposition notification message toward the sender mobile station.

11. The communication network as claimed in claim 10, wherein when determining that the recipient mobile station is not operative to receive the message formatted according to the first messaging protocol, the messaging application server is further configured to determine that the recipient mobile station is not configured to receive messages formatted according to the first messaging protocol.

12. The communication network as claimed in claim 10, wherein when determining that the recipient mobile station is not operative to receive the message formatted according to the first messaging protocol, the messaging application server is further configured to receive an error message indicating that the recipient mobile station is not operative to receive messages formatted according to the first messaging protocol.

13. The communication network as claimed in claim 10, wherein the communication network further comprises the recipient mobile station, and wherein the recipient mobile station is configured to receive the converted message formatted according to the second messaging protocol.

14. The communication network as claimed in claim 13, wherein the recipient mobile station is further configured to, in response to receiving the converted message, transmit the notification message toward the messaging application server.

15. The communication network as claimed in claim 10, wherein the sender mobile station is further configured to generate a user notification in response to receiving the disposition notification message.

16. The communication network as claimed in claim 15, wherein the generated user notification indicates that the message was delivered to the recipient mobile station via a messaging protocol different from the first messaging protocol.

17. The communication network as claimed in claim 10, wherein the first messaging protocol supports more messaging functionalities than the second messaging protocol.

18. The communication network as claimed in claim 10, wherein the first messaging protocol is a packet-switched based messaging protocol, and the second messaging protocol is a circuit-switched based messaging protocol.

* * * * *

UNITED STATES PATENT AND TRADEMARK OFFICE
CERTIFICATE OF CORRECTION

PATENT NO. : 11,588,777 B2
APPLICATION NO. : 17/529973
DATED : February 21, 2023
INVENTOR(S) : Badulescu et al.

It is certified that error appears in the above-identified patent and that said Letters Patent is hereby corrected as shown below:

On the Title Page

On Page 2, item [56], in Column 2, Line 6, delete "HowTo" and insert -- How To --, therefor.

On Page 2, item [56], in Column 2, Line 13, delete "by:" and insert -- By: --, therefor.

In the Specification

In Column 1, Line 13, delete "2019;" and insert -- 2019 (now U.S. Pat. No. 11,258,748); --, therefor.

In Column 1, Line 33, delete "in incorporated" and insert -- is incorporated --, therefor.

In Column 2, Line 28, delete "others" and insert -- others are --, therefor.

In Column 3, Lines 64-65, delete "Signal System 7 (SS7)" and insert -- Signaling System 7 (SS7) --, therefor.

In Column 5, Lines 30-31, delete "Signal System 7 (SS7)" and insert -- Signaling System 7 (SS7) --, therefor.

In Column 9, Line 65, delete "As the" and insert -- As with the --, therefor.

In Column 13, Line 29, delete "(DVD-ROM) memory" and insert -- (DVD-ROM), memory --, therefor.

Signed and Sealed this
Nineteenth Day of September, 2023

Katherine Kelly Vidal
*Director of the United States Patent and Trademark Office*